United States Patent
Bertolotti

(10) Patent No.: US 7,152,829 B2
(45) Date of Patent: Dec. 26, 2006

(54) PERFORATED SKIN STRUCTURE FOR LAMINAR-FLOW SYSTEMS

(75) Inventor: Fabio P. Bertolotti, South Windsor, CT (US)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/511,930

(22) PCT Filed: Apr. 17, 2003

(86) PCT No.: PCT/US03/12008

§ 371 (c)(1),
(2), (4) Date: Oct. 18, 2004

(87) PCT Pub. No.: WO03/089295

PCT Pub. Date: Oct. 30, 2003

(65) Prior Publication Data

US 2005/0178924 A1    Aug. 18, 2005

Related U.S. Application Data

(60) Provisional application No. 60/373,653, filed on Apr. 18, 2002.

(51) Int. Cl.
*B64C 21/06* (2006.01)
(52) U.S. Cl. .................................................... 244/209
(58) Field of Classification Search ................ 244/209, 244/208, 201, 204, 130
See application file for complete search history.

(56) References Cited

U.S. PATENT DOCUMENTS 2,646,945 A * 7/1953 Perry ......................... 244/204
2,742,247 A * 4/1956 Lachmann ................... 244/130
2,833,492 A    5/1958 Fowler
3,203,648 A    8/1965 Vanesian
3,261,576 A * 7/1966 Valyi .......................... 244/130
3,521,837 A    7/1970 Papst
3,951,360 A    4/1976 Anxionnaz
5,141,182 A * 8/1992 Coffinberry ................. 244/209
5,263,667 A    11/1993 Horstman (Continued)

OTHER PUBLICATIONS

H. Bippes, "Basic Experiments on Transition in Three-Dimensional Boundary-Layers Dominated by Crossflow Instability", Progress in Aerospace Sciences 35, pp. 363-412, 1999.

(Continued)

*Primary Examiner*—Tien Dinh
(74) *Attorney, Agent, or Firm*—W. F. Fasse; W. G. Fasse

(57) ABSTRACT

The outer skin (100) of an aerodynamic body (40) has perforations (200) arranged in particular patterns in respective spanwise extending groups or bundles (250). Each perforation is preferably a micro-slot with a length of 100 to 3000 μm and a width of 50 to 250 μm. Air is sucked through the micro-slots from the boundary layer flowing over the outer skin, to achieve boundary layer control. In each bundle, the pattern, size, orientation, and other parameters of the micro-slots are designed to achieve mutual destructive interference of flow disturbances arising due to the suction, to minimize the excitation of flow instabilities in the boundary layer. Particularly, the spatial spectrum of the perforation pattern of a given bundle is essentially absent of significant energy at predetermined wavelengths of predetermined flow instabilities that otherwise appear in the boundary layer air flow. The aerodynamic body further includes supporting ribs (300) extending parallel to the perforation bundles (250) and a perforated inner plate (400) providing a throttling control of the suction flow through groups of the bundles.

31 Claims, 10 Drawing Sheets

U.S. PATENT DOCUMENTS

| | | | |
|---|---|---|---|
| 5,316,032 | A | 5/1994 | DeCoux |
| 5,884,873 | A | 3/1999 | Breit |
| 5,899,416 | A | 5/1999 | Meister et al. |
| 6,050,523 | A | 4/2000 | Kraenzien |
| 6,119,987 | A | 9/2000 | Kiknadze et al. |
| 6,216,982 | B1 | 4/2001 | Pfennig et al. |
| 6,332,593 | B1 | 12/2001 | Kamiadakis et al. |
| 6,415,510 | B1 | 7/2002 | Mertens et al. |
| 6,866,233 | B1 * | 3/2005 | Patel et al. .................. 244/204 |

OTHER PUBLICATIONS

D. Arnal et al., "Influence of Surface Roughness and of Suction on the Receptivity of a Swept-Wing Boundary Layer", in Laminar-Turbulent Transition proceedings, IUTAM Symposium, Sedona AZ, Sept. 13-17, 1999, pp. 589-594, published by Springer Verlag, H. Hasel (Ed.), 2000.

P. Wassermann et al., "DNS-Investigations of the Development and Control of Cross Flow Vortices in a 3-D Boundary-Layer Flow", in Laminar-Turbulent Transition proceedings, IUTAM Symposium, Sedona AZ, Sep. 13-17, 1999; pp. 565 to 570, published by Springer Verlag, H. Hasel (Ed.), 2000.

F. P. Bertolotti, "Receptivity of Three-Dimensional Boundary-Layers to Localized Wall Roughness and Suction", Phys. Fluids, vol. 12, No. 7, p. 1799-1809, Jul. 2000.

F. P. Bertolotti, "The Equivalent Forcing Model for Receptivity Analysis with Application to the Construction of a High-Performance Skin Perforation Pattern for LFC"; from S. Wagner et al. (Editors), "Recent Results in Laminar-Turbulent Transition" Springer Verlag Publishers, Heidelberg, Germany, Notes on Numerical Fluid Mechanics and Multidisciplinary Design, vol. 86, 2003.

R. Messing et al., "Effects of Suction Through Arrays of Holes on a 3-D Boundary Layer Investigated by Spatial Direct Numerical Simulation", Institut fuer Aerodynamik und Gasdynamik, University Stuttgart, Stuttgart, Germany; in Laminar-Turbulent Transition proceedings, IUTAM Symposium, Sedona AZ, Sep. 13-17, 1999; pp. 235-240, published by Springer Verlag, H. Hasel (Ed.), 2000.

C. Abegg et al., "Stabilization of Boundary-Layer Flows Subject to Crossflow Instability with the Aid of Suction", DLR, Institute of Fluid Mechanics, Goettingen, Germany, in Laminar-Turbulent Transition proceedings, IUTAM Symposium, Sedona AZ, Sep. 13-17, 1999; pp. 607 to 612, published by Springer Verlag, H. Hasel (Ed.) 2000.

* cited by examiner

PERFORATED SKIN STRUCTURE FOR LAMINAR-FLOW SYSTEMS

CROSS-REFERENCE TO RELATED APPLICATION

This application is based on and claims the priority, under 35 U.S.C. §119(e) and PCT Article 8, of U.S. Provisional Application 60/373,653, filed on Apr. 18, 2002, the entire disclosure of which is incorporated herein by reference.

TECHNICAL FIELD

This invention relates to the construction of a perforated skin structure for the application of laminar-flow control via suction of boundary layer air.

BACKGROUND ART

It is generally known in the art that the laminar-flow conditions of the boundary layer of a fluid flowing over the surface of a body can be influenced by various devices. It is further known that stabilizing the laminar-flow conditions of the boundary layer can reduce the resulting skin friction between the fluid and the body. This is especially pertinent, for example, in the field of aircraft construction, whereby the improvement of the laminar-flow of the boundary layer and the resulting lower skin friction can achieve potential fuel savings in the operation of the aircraft.

For these reasons, the use of surface suction through a porous or perforated surface for stabilizing the laminar-flow boundary layer of the fluid flowing over, or relative to, the surface has been widely studied for many decades. In the context of commercial aircraft, known laminar-flow control devices generally must operate with the best efficiency at only one condition, namely the cruise flight condition, and are thus designed primarily for this operating condition.

It has been preferred to apply surface suction through a purposely perforated surface, rather than a porous surface, due to the control of the surface characteristics that can be achieved by purposely forming the perforations, for example with desired sizes, patterns, and spacings. It is known to form such perforations by mechanical drilling, etching, electron beam boring, or laser beam boring. Typical conventional perforation designs provide perforations that are essentially small holes with circular plan or sectional shapes, with a diameter much smaller than the thickness of the boundary layer flowing over the surface. Typical diameters of the perforations or holes are conventionally in the range of 50 to 100 µm. Typical conventional spacings between adjacent perforations range from 200 to 5000 µm.

According to the prior art, the holes or perforations are typically provided in patterns that are regular and spatially repeating or similar (e.g. essentially translationally invariant) over wide portions of the surface. Examples of such patterns are checkerboard patterns, or patterns of linear rows of holes with essentially equal hole-to-hole spacing along each row and essentially equal row-to-row separation. The perforation density is generally held constant, for machining convenience and the like, but advantages of spatially varying porosity have been discussed. For example, U.S. Pat. No. 5,263,667 (Horstman) describes a rectilinear pattern of perforations with spatially varying perforation density, in an effort to achieve an essentially constant suction velocity in a region of varying external pressure.

The following U.S. patents are also generally related to the art of boundary layer control by suction: U.S. Pat. Nos. 5,884,873; 5,899,416; 6,050,523; 6,216,982; and 6,415,510.

All known perforation patterns described in the previous art are generic in the sense that they are not determined from, and do not reflect or contain, any information regarding the structure, form, flow conditions, or especially flow instabilities of the boundary layer that flows over the perforated surface. Since the abatement and elimination of such flow instabilities is a primary purpose of the laminar-flow control system, as recognized and developed by the present inventor, all previously existing or suggested perforation patterns of conventional surface suction systems yield either inefficient or dysfunctional laminar-flow control results. The basic reason for such inefficiency lies within the physics governing the boundary layer instabilities.

As known by those skilled in the art, boundary layer flows developing over a swept wing, a swept vertical stabilizer, or a swept horizontal fin of an aircraft have three velocity components and are thus called three-dimensional (3-D) boundary layer flows. While the laminar-turbulent flow transition in two-dimensional boundary layers is dominated by traveling waves known as Tollmien-Schlichting waves (TS waves), the three-dimensional boundary layers are high unstable to steady cross-flow vortices (CF vortices), which dominate the laminar-turbulent flow transition process in the three-dimensional flow context.

Experiments have shown that suction through a conventional perforation pattern in a 3-D boundary layer has two opposing effects, namely one of stabilization due to a change in the mean velocity profile, and one of destabilization due to the excitation of steady cross-flow vortices by variations and inhomogeneities in the suction distribution. In this regard see H. Bippes (1999), "Basic experiments on transition in 3D boundary-layers dominated by crossflow instability", Progress in Aerospace Sciences 35: 363–412 and D. Arnal, A. Seraudie, J. P. Archambaud, "Influence of surface roughness and of suction on the receptivity of a swept-wing boundary layer", Laminar-Turbulent Transition, IUTAM Symposium, Sedona Ariz., Sep. 13–17, 1999, Springer, 2000. It has also been observed that there is a clear limit to the amount of suction that can be applied to 3-D boundary layers, beyond which the flow in the vicinity of each hole becomes sufficiently distorted to cause the flow to undergo an immediate and irrecoverable transition to turbulence. This effect is called "oversuction". In this regard, see P. Wassermann and M. Kloker, "DNS-investigations of the development and control of cross-flow vortices in a 3-D boundary-layer flow", Laminar-Turbulent Transition, IUTAM Symposium, Sedona Ariz., Sep. 13–17, 1999, Springer, 2000.

At any suction level, the hole pattern has a dominant influence on non-uniformities in the suction distribution. For values of suction strength below the "oversuction" level, the present inventor has previously described a formulation for determining the wavenumber components of the surface hole distribution that are most efficient in stimulating unstable boundary-layer modes. See F. P. Bertolotti (2000), "Receptivity of three-dimensional boundary-layers to localized wall roughness and suction", Phys. Fluids, Vol. 12, Number 7, pg. 1799–1809). In most conventional cases, the hole-to-hole spacing is smaller than the smallest wavelength of amplified disturbances. Theoretical results assuming a perfectly homogeneous wall-suction distribution in space show that both the TS waves and the CF vortices are strongly stabilized by suction, in contradiction to the above mentioned experimental findings. The cause has been traced to variations, or inhomogeneities, in the actual suction distribution in the experiments, as a result of various phenomena that introduce unwanted and harmful variations in the suction distribution pattern. Namely, it has now been considered by the present inventor, that the following phenomena introduce such unwanted and harmful variations in the suction distribution pattern.
a) Unavoidable boring or machining inaccuracies and tolerances, to which the overall laminar-flow control efficiency is highly sensitive;
b) Clogging of perforations by contamination or particulate matter during operation;
c) Blockage of perforations by the structure supporting the perforated skin;
d) Suction inhomogeneity within the internal suction chambers applying suction to the perforated skin;
e) Chordwise variations in external pressure; and
f) Flow distortions in the vicinity of a perforation due to large suction velocities.

Among the above phenomena, the phenomena identified as a), b) and c) introduce variations in the perforation geometry, while d), e) and f) introduce variations in the suction strength and flow conditions. All of these phenomena produce harmful variations in the suction pattern. Furthermore, these phenomena can have interactive effects with one another. For example, when only a single suction plenum, or only a few suction plenums are used below the perforated skin, the phenomenon e) strongly affects the pressure-drop across the skin and may cause "oversuction" to occur at some locations, resulting in flow distortions according to phenomenon f).

DISCLOSURE OF THE INVENTION

In view and in consideration of the above, the invention aims to achieve the following objects singly or in combination:
to provide a perforation shape and a perforation distribution pattern for a laminar-flow control device employing suction, that overcomes harmful or disadvantageous effects of the following phenomena:
a) Unavoidable boring or machining errors;
b) Clogging of perforations;
c) Blockage by the structure supporting the perforated skin;
d) Suction inhomogeneity within the internal suction chambers; and
e) Flow distortions in the vicinity of a perforation due to large suction velocities;
to provide a perforated skin structure that compensates for chordwise external variations in external pressure;
to provide a perforated skin structure that has structural rigidity, and avoids significant weakening effects of the perforations; and
to provide a perforated skin structure that has high thermal conductivity.

The invention further aims to avoid or overcome the disadvantages of the prior art, and to achieve additional advantages as apparent from the present description, claims, abstract, and drawings.

The above objects have been achieved according to the invention in a laminar flow control arrangement including a perforated skin constructed with numerous perforations arranged in a pattern having a spatial spectrum that is essentially absent of energy at predetermined wavelengths. The term "essentially absent of energy" must be understood in relation to the additional peak energy above the average background "noise" level of energy resulting from the unavoidable machining inaccuracies and the like. Preferably, these predetermined wavelengths are the wavelengths of predetermined flow instabilities, and especially the most unstable disturbances appearing in the boundary layer flowing over the perforated skin, particularly at the design operating conditions of the laminar-flow control arrangement, such as at the aircraft cruise flight conditions of the pertinent aircraft.

The preferred embodiment or mode of the inventive pattern and shape of perforations comprises a plurality of longitudinally extending perforated areas or groups of rows of perforations, which are spaced apart from each other, and which are called "bundles" herein. Most preferably, these longitudinally extending bundles are aligned essentially parallel (e.g. within 10° or preferably 5° of parallel) to the leading edge of the surface provided with the perforations, for example the perforated skin of the airfoil. The term "essentially parallel" also allows for a slight convergence of the bundles relative to each other, from the root end to the tip end of the airfoil, for example following the taper of the airfoil. The bundles are separated laterally from one another by non-perforated areas.

Each bundle comprises a plurality of perforations arranged to yield a spatial spectrum of each respective bundle that has reduced energy or is preferably essentially absent of energy (above a general or average "noise" energy level) at predetermined wavelengths. This is especially achieved by arranging the perforations of a given bundle so that the disturbances in the flow created by suction through the several perforations of the bundle mutually cancel each other out, or at least mutually destructively reduce each other, by destructive interference at these predetermined wavelengths. Preferably, these wavelengths are the wavelengths of the most unstable disturbances appearing in the boundary layer flowing over the perforated skin. Preferably, each perforation has the form of an elongated micro-slot having a width in the range of 50 to 250 µm and a length in the range of 100 to 3000 µm.

According to a further embodiment feature of the invention, the laminar-flow control arrangement further includes a supporting structure that underlies and supports the perforated outer skin. The supporting structure is preferably in structural union with, e.g. joined or connected to, the outer perforated skin only at the non-perforated surface areas between the respective bundles of perforations. In a particular preferred embodiment, the supporting structure comprises longitudinal ribs running parallel to the adjacent bundles. In a further preferred feature of the invention, the supporting structure additionally comprises an inner perforated member such as a perforated inner plate member in structural union with the ribs below and spaced apart from the perforated outer skin, to form chambers respectively bounded by the perforated outer skin, adjacent pairs of the ribs, and the inner perforated member. The inner perforated member has second perforations that provide an inner surface with a predetermined and varying porosity to compensate for variations in external pressure and thereby to provide the desired suction rate through the perforated skin surface at all chordwise locations. Particularly, suction is applied to the side of the inner perforated member opposite the outer perforated skin, so as to apply suction to the chambers, which in turn applies suction to the primary perforations of the perforated outer skin. The inner perforated member and the outer perforated skin are each joined or connected with the ribs in any suitable manner, but preferably may be integrally formed, for example by integral extrusion.

BRIEF DESCRIPTION OF THE DRAWINGS

In order that the invention may be clearly understood, it will now be described in connection with example embodiments, with reference to the accompanying drawings, wherein.

DETAILED DESCRIPTION OF EXAMPLE EMBODIMENTS AND THE BEST MODE FOR CARRYING OUT THE INVENTION

Figure 1:
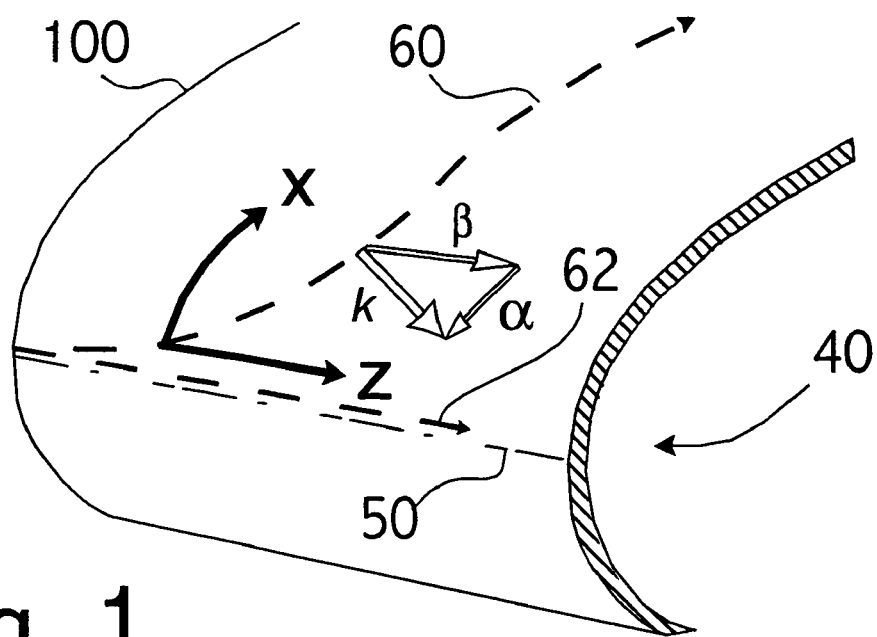
FIG. 1 is a schematic perspective view of a portion of the leading edge of an airfoil embodied according to the invention, showing a coordinate system used for reference.

The invention will now be described in connection with an example relating to an airfoil, such as the vertical fin or the main lifting wing of an aircraft, which represent highly effective and preferred applications of the invention. As a reference for the following discussion, FIG. 1 schematically shows the basic geometry of a representative aerodynamic body 40 such as an airfoil portion of a lifting wing or the like of an aircraft. The aerodynamic body 40 has an outer skin 100 and a leading edge 50. When this aerodynamic body 40, or especially the airfoil 40, is moving through the air, the free-stream airflow impinges onto and grazes along the aerodynamic body 40, thereby creating a boundary layer airflow over the outer skin 100. The aerodynamic body 40 and particularly its leading edge 50 is positioned with a rearward sweep angle relative to the free-stream airflow direction, and consequently, the airflow attaches along the leading edge 50 to form a streamline 62 of rectilinear form running parallel along the leading edge.

For reference, FIG. 1 further shows a coordinate system with "z" identifying the direction along the leading edge (the spanwise direction), and "x" identifying the direction normal to the leading edge (chordwise direction). Due to the sweepback mentioned above, the flow streamlines of the airflow outside the boundary layer (potential flow) that impinge away from the attachment line 62 directly along the leading edge 50 develop a curved flow path as shown by the curved dashed line 60.

Also represented in the flow pattern is an amplified cross-flow vortex, with wavenumber vector k oriented locally essentially perpendicular to the curved path of the freestream flow line 60. This wavenumber vector k is composed of a component with wavenumber $\beta$ in the spanwise direction z and a component with wavenumber $\alpha_r$ in the chordwise direction x. For each value of $\beta$, the value of $\alpha_r$ is given by a wave dispersion relation that can be experimentally or computationally determined in a conventionally known manner, for the respective flow condition at each respective chordwise location of a given airfoil.

Starting from these basic points and considerations in connection with FIG. 1, the underlying characteristic features of the invention will first be theoretically developed in the following discussion, and then specific concrete examples and applications thereof will be described.

Figure 2:
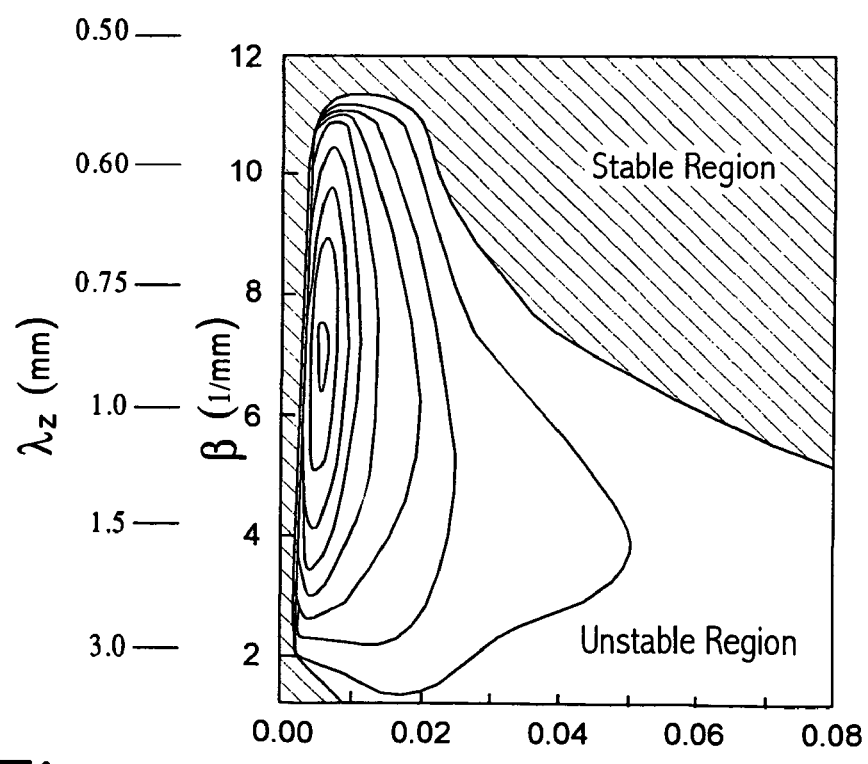
FIG. 2 is a stability diagram showing the spanwise wave number versus the arch length along the surface of the airfoil of a representative aircraft at cruise.
Figure 3:
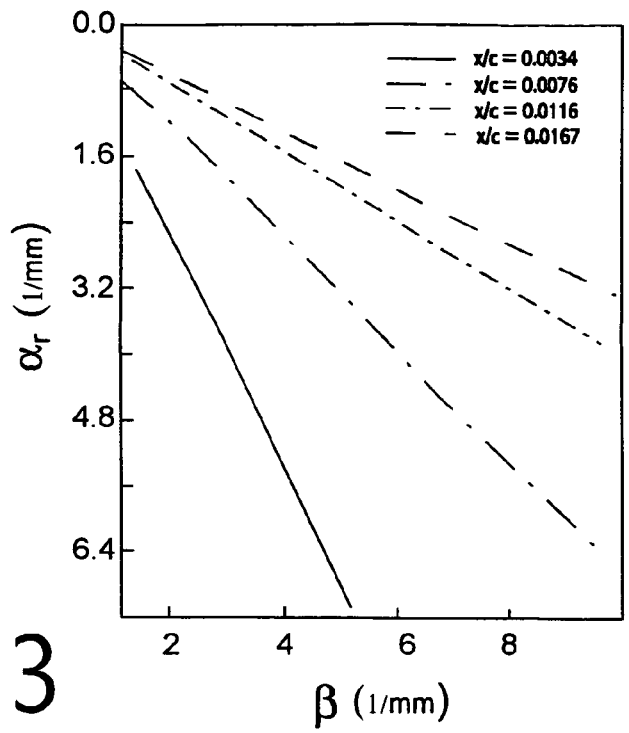
FIG. 3 is a diagram showing the wavenumber dispersion relations at selected chordwise locations in connection with the example of FIG. 2.

FIGS. 2 and 3 show the respective regions of stable and unstable spanwise wavelengths and wavenumbers for steady cross-flow (CF) vortices, as a function of chordwise location (i.e. arch length along the airfoil surface), for the case of flight of a representative example aircraft wing at cruising speed and altitude. The actual numerical values are only representative, and secondary in importance to the concepts and procedures to be described. Thus, more particularly, FIG. 2 shows the stability diagram for steady cross-flow disturbances as a function of spanwise wavenumbers $\beta$ of the flow with respect to chordwise locations x/c near the leading edge 50. The wavelength, in millimeters, of the steady cross-flow modes of the flow is also shown. In this example, the spanwise wavenumber $\beta$ of the steady crossflow mode remains essentially constant as it propagates downstream, while the chordwise wave number $\alpha_r$ thereof changes so that the wavenumber vector k remains essentially normal (within 5 to 10°) to the free-stream streamline 60 (see FIG. 1). FIG. 3 displays the dispersion relationships between β and $\alpha_r$ at selected downstream locations. Together, FIGS. 2 and 3 present the wavenumber information needed for the construction of the present invention.

As generally discussed above, boring and machining inaccuracies or tolerances, as well as clogging of perforations, have a significant influence on the spectrum, i.e. the wavelength distribution of the suction flow conditions around the perforations. For the present demonstrative example to illustrate these effects, the following rather conservative tolerances are assumed: boring +/−15 μm, and hole-center location +/−20 μm. Additionally, based on an inspection of a perforated skin after use in both a wind tunnel and in an aircraft application, it was found that a large number of holes became clogged by particulate material and contaminants. For the present example, conservative clogging levels of 10 to 14% (i.e. 1-in-10 to 1-in-7 holes are clogged) are assumed.

The presence of these machining tolerances, plus clogging, introduces variations in the suction distribution at all wavelengths. Since the energy at these wavelengths is proportional to the peak suction velocity through a hole or perforation, the simplest way to lower the detrimental effect of boring inaccuracies is to increase the overall porosity and thereby reduce the peak suction velocity for a given total suction air flow. With regard to clogging, the use of slots instead of round holes reduces the clogging problem, but elongated slits or slots having a substantial length are harmful and generally not acceptable, because they substantially reduce the stress-carrying ability of the outer skin.

Figure 4:
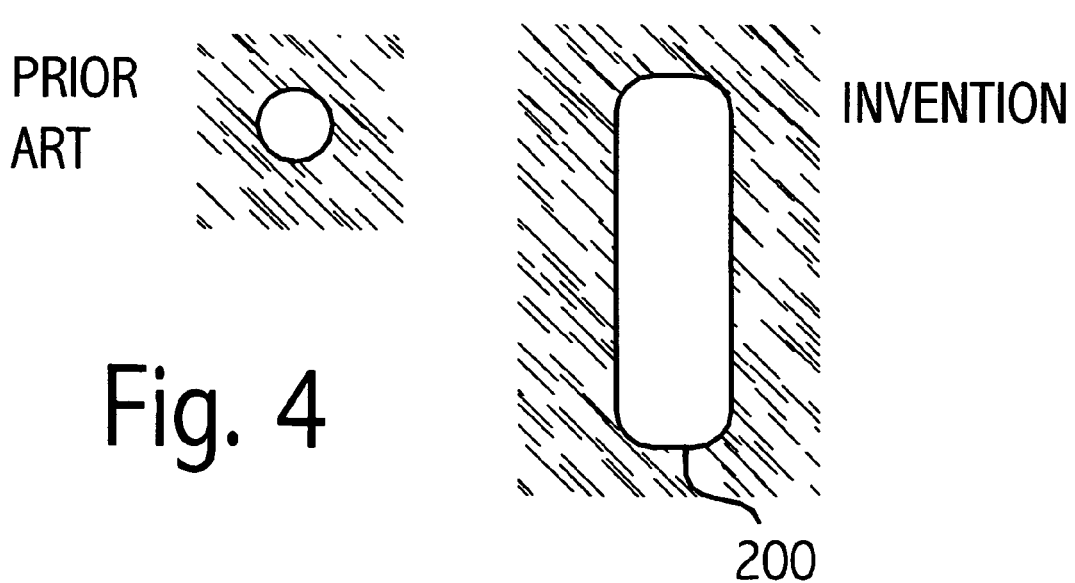
FIG. 4 is a schematic plan view showing a typical conventional perforation or hole having a round shape, as well as a typical micro-slot perforation according to the invention having an oblong shape.

The invention overcomes the above problems by employing "micro-slits" or "micro-slots" 200 (see FIG. 4). The inventive micro-slots 200 have a generally oblong plan shape, with a length of about 250 μm and a width of about 70 μm in the present example. Generally, the size of the micro-slots according to the invention may comprise a length in the range of 100 to 3000 μm, more preferably with a practical maximum length of 500 μm, and a preferred maximum length of 200 to 300 μm, and a width in a range of 50 to 250 μm, and a preferred width at the lower end of that range, for example not more than 100, or not more than 80 μm. The overall porosity, i.e. the ratio of open hole area relative to total surface area is preferably up to about 10%, but practically preferably about 5%. In comparison to the prior art small circular holes, also shown in FIG. 4, the micro-slots 200 preferably used according to the invention offer a greater open area, and are thus well suited to providing somewhat higher porosity levels, while the elongated form also makes the micro-slots 200 significantly less likely to clog than the small round holes. On the other hand, the length of the micro-slots is limited to avoid the substantial reduction of the stress-carrying ability of the perforated outer skin that would arise with longer slots.

Further developing the present example, an optimized perforation pattern can be constructed by first considering a simple single linear row of micro-slots 200, with the long axis of each micro-slot 200 aligned with the longitudinally extending row direction. Alternative patterns with the slots oriented at a predetermined angle to the local free-stream direction 60 are preferable near the leading edge 50 of the aerodynamic body 40 (as will be discussed further below in connection with FIGS. 6 and 6A) and in cases of high suction levels. In the present simplest example, the single micro-slot row has a separation of 400 μm between successive micro-slots, which thus yields a periodic pattern with a period of 650 μm (i.e. the 250 μm micro-slot length plus the 400 μm longitudinal spacing separation). This periodicity of the physical pattern of the perforations results in a particular spectral distribution of the physical pattern as well as of the flow disturbances generated thereby, as will be considered next.

Figure 5:
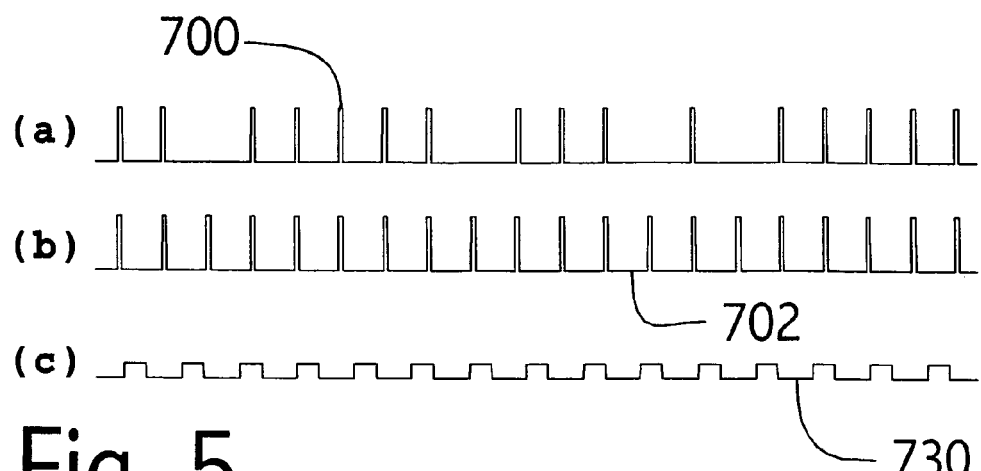
FIG. 5 is a graphical representation of the velocity amplitudes of three example suction perforation arrangements, namely a single row of conventional holes in case (a) and case (b), and a single row of inventive micro-slots in case (c)
Figure 5A:
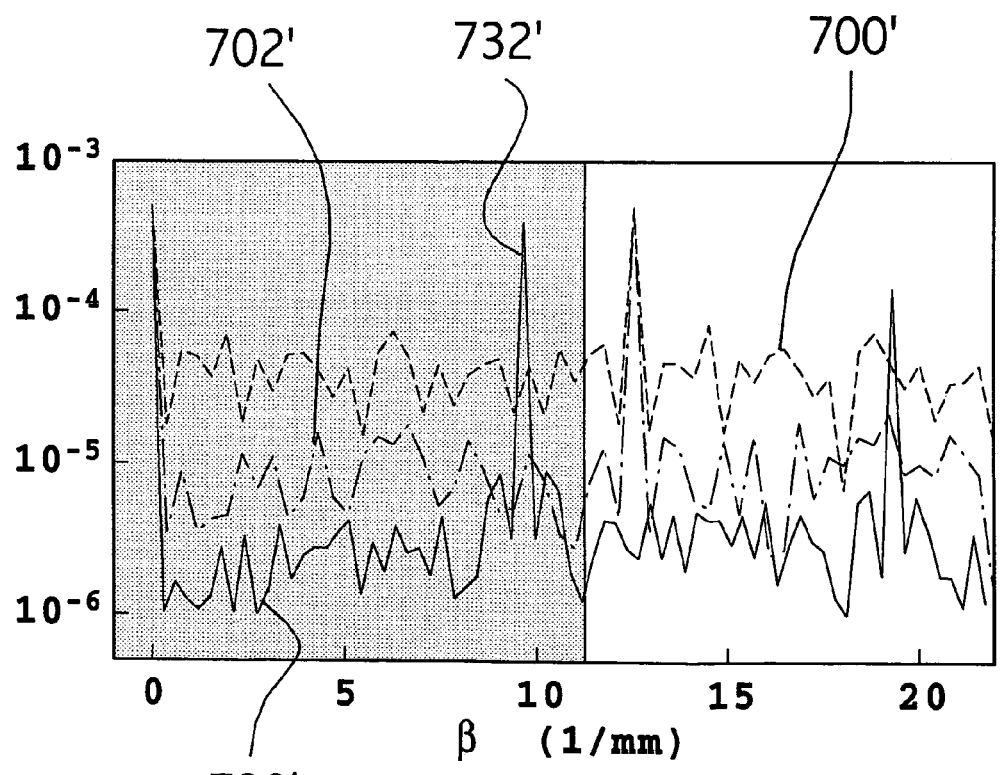
FIG. 5A shows the Fourier transforms of the three suction perforation arrangements associated with FIG. 5.

FIGS. 5 and 5A compare the spectra of the suction velocity for three rows of perforations, all having the same total or average mass flux. FIG. 5 shows a diagrammatic representation of the flow velocity amplitudes respectively for the three rows of perforations (a), (b) and (c). Row (a) with reference number 700, is a conventional hole geometry of 50 μm holes spaced 0.5 mm apart, with a 15% probability of clogging and a peak velocity of 1. In other words, the unclogged holes show a flow velocity of 1, while the clogged holes show no flow velocity, i.e. a flow velocity of 0. Row (b), with reference number 702, is a conventional hole geometry with the same holes as row (a) 700, but with 0 probability of clogging, i.e. without any of the holes being clogged. Row (c), with reference number 730, represents a row of micro-slots according to the present example of the invention, with no clogging and a peak velocity of 0.26 for each hole. Note that the larger size of the micro-slot in comparison to the conventional holes achieves the same total airflow mass flux with a lower peak velocity for each perforation. These results were obtained by averaging 1000 configurations, each of which having randomly assigned values of clogging percentage and machining tolerances within their permitted range.

FIG. 5A is a graph showing the Fourier transform of the wavenumber β spectra of the flow profiles generated by the respective rows 700, 702 and 730, whereby the respective spectra are identified with reference numbers 700', 702', 730', respectively. As can be seen, the micro-slot spectrum 730' yields about a 3-fold reduction in amplitude at all wavenumbers in comparison to conventional geometry (b) 702'. This reduction is due to the lower peak velocity over the slots. More importantly, the micro-slots offer a 30–50 fold reduction in amplitude at essentially all wavenumbers when compared to the conventional configuration (a) 700' which is more representative of actual conventional perforated plates with clogging. Thus, micro-slots greatly minimize the effect of boring and machining tolerances, and clogging.

However, this reduction was achieved in the present example at the expense of introducing a large amplitude peak 732' (β=9.66 1/mm) within the band of amplified unstable CF modes, denoted by the gray region in the figure. Due to this peak, a simple, or regular, arrangement of micro-slot rows would yield worse performance than the conventional pattern, which has its first large peak outside the amplified band. It is exactly such an undesirable peak 732' that can and will be "removed" or "canceled" by destructive interference according to the invention, as will be discussed below. Note that spacing the micro-slots closer together, say at 0.5 mm periods, would shift the amplitude peak 732' barely outside the amplified range. While this spacing is an option in this example (and the subsequent work applies this spacing, as well) there are other laminar-flow applications where this option is not available. To display the generality and great effectiveness of the inventive procedure and structure, the inventive high-performance pattern of perforations will now be developed with the chosen spacing.

Using the fundamental idea of this invention, namely that the overall resultant spectrum of the total hole pattern must have essentially negligible energy (above the base "noise" level) at the wavenumbers of the unstable flow disturbances, the potentially harmful effect of the peak 732' at $\beta^+=9.66$ 1/mm will be eliminated by purposely introducing another flow disturbance by another row of micro-slots with a spectral component that will constructively interfere with the undesirable peak 732' at the relevant wavelength. This is carried out by constructing a series of rows of micro-slots, referred to herein as a "bundle" 250, in such a way that the Fourier transformed total geometry of the overall bundle has essentially no resultant amplitude (e.g. due to mutual destructive interference) at the streamwise wavenumbers $\alpha_r^\dagger$ of the CF mode with $\beta=\beta^+$ spanwise wavenumber. Note that if the most amplified mode was a traveling mode, then the $\alpha_r$ corresponding to this mode would be selected. The present invention is not limited to steady cross-flow modes.

Figure 6:
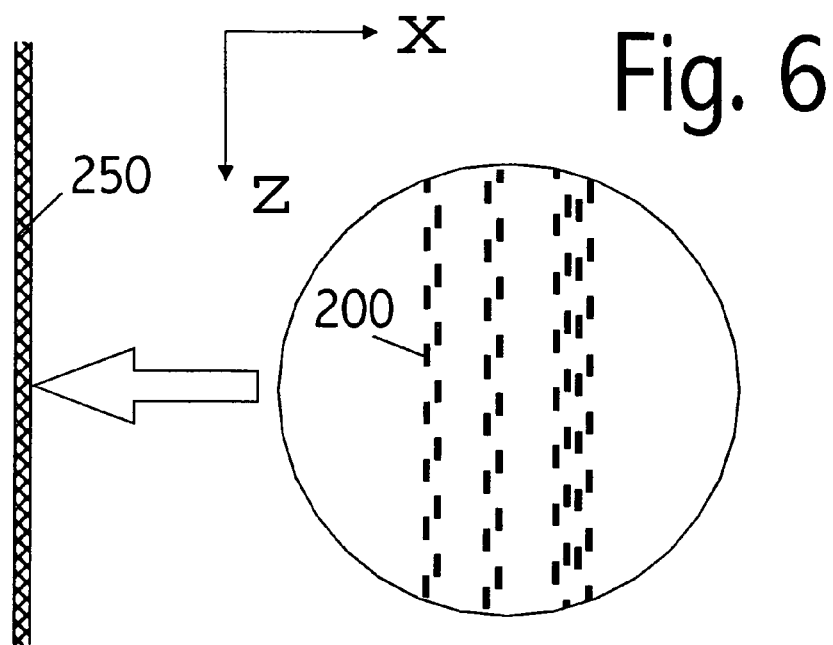
FIG. 6 is a schematic plan view of one bundle or longitudinal stripe of several rows of micro-slots according to the invention, also shown in an enlarged view, with the long axis of the micro-slots aligned with the bundle longitudinal direction.

Choosing x/c=0.0076 for this example, FIG. 3 shows that $\beta^+=9.66$ corresponds to $\alpha_r^\dagger=6.4$ 1/mm. Next, make a bundle 250 of a small number N of micro-slot rows, say eight, in a general chordwise proximity, and take the precise streamwise location $x_n$ and phase in spanwise direction $\phi_n$ (and optionally the width $r_n$) of each row as the unknowns that minimize the square of the transform function:

$$\epsilon(\{X_n\}, \{\phi_n\}, \{r_n\}) = \int_{\alpha 1}^{\alpha 2} \mathcal{F}(\alpha)\mathcal{F}*(\alpha) d\alpha \quad (1)$$

$$\mathcal{F}(\alpha) = \sum_{n=1}^{N} e^{i\phi_n - i\alpha x_n} \left[ \frac{\sin(r_n \alpha)}{\alpha} \right] \quad (2)$$

in the range $\alpha_1 < \alpha < \alpha_2$ centered about $\alpha_r^\dagger$ of the CF mode with $\beta=\beta^\dagger$. The function $\mathcal{F}$ is the Fourier transform of a series of rectangular pulses of width 2r, where 2r matches the width of a micro-slot. The resulting geometry for this example case is shown in FIG. 6. This geometry is not unique, and depends to a large extent on the optimizer used to minimize $\epsilon$. What is unique, is the minimal energy of the geometry of one bundle 250 in the selected range of $\alpha$. In this example, the chordwise extent of the bundle 250 is about 1.75 mm. Other widths are possible.

Figure 7:
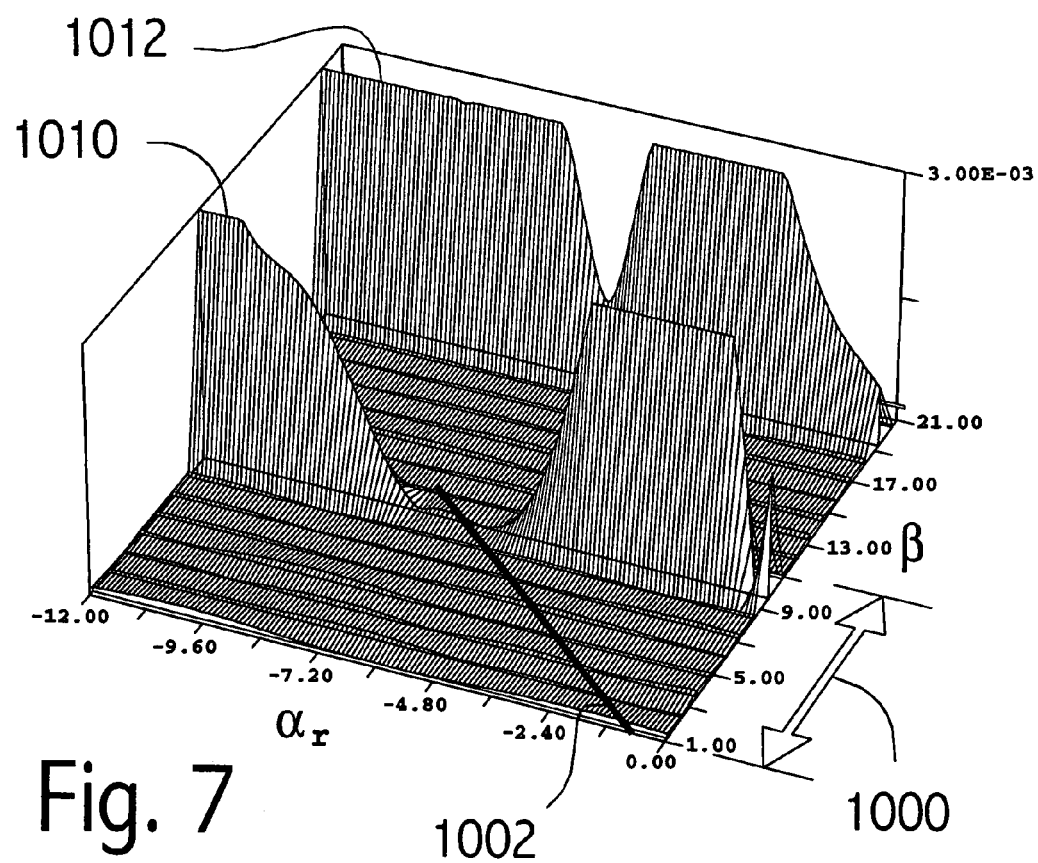
FIG. 7 is a three-dimensional graphical representation of a double Fourier transform of the spectrum produced by a single bundle of micro-slots according to the invention as shown in FIG. 6.

The corresponding spectrum in the $\alpha_r$-$\beta$ plane is shown in FIG. 7. The substantial (clipped) peaks 1010 and 1012 of the spectrum correspond to the peak 732' at $\beta=9.66$ 1/mm and the peak at $\beta\approx19$ 1/mm in FIG. 5A, now seen also in the $\alpha$ dimension. The dark line 1002 shows the $\alpha_r$-$\beta$ combination, i.e. the dispersion relation, for the unstable modes at this x location (see FIG. 3). All along this line 1002 the amplitude of the spectral peaks 1010 and 1012 is very low, showing that essentially no CF modes are generated by the selected perforation pattern distribution. Note that the unstable mode line 1002 passes through a "valley" in the spectral ridge or peak 1010. This "valley" is formed by purposeful destructive interference at this wavenumber combination by the proper design and selection of the pattern of the perforations, of which the individual spectral influences interfere with one another. In this example, with reference to FIGS. 5A and 7, the inventive goal of achieving essentially no energy or negligible energy at the pertinent selected wavelengths can thus be understood as meaning that, along the dispersion relation 1002 in Fourier space, there are no peaks of wavenumber amplitude with an amplitude value more than ten times (for example) the overall average amplitude of the spectral range spanning twice the unstable wavenumber range. Thus, in FIG. 5A it can be seen that the peak 732' of higher unacceptable amplitude must be eliminated to achieve the inventive goal.

More particularly, reference numbers 1010 and 1012 identify components of the energetic wavelengths related to or resulting from the particular bundle geometry or pattern of perforations. The range 1000 of $\beta$ values denotes the $\beta$ values for which steady cross-flow modes are unstable at the location of the selected bundle, and the line 1002 particularly denotes the associated wave dispersion relation, for example according to FIG. 3. As indicated by the dip in energy in the spectral component 1010 at the location at the intersection with the dispersion relation 1002, the spatial spectrum of this bundle is essentially absent of energy (above a base "noise" level) at this selected or predetermined wavelength. These predetermined wavelengths are chosen to match the wavelengths of predetermined flow instabilities appearing in the boundary layer above the respective bundle at cruise conditions. As a result of the inventive destructive interference, such that there is essentially no energy at the selected predetermined wavelengths of flow instabilities, the action of suction through the perforations will generate a minimum excitation of flow instabilities in the boundary layer stream above the perforated skin.

As is known to those skilled in the art, the receptivity coefficient is a factor that couples the amplitude of the spatial spectrum of the surface suction distribution to the amplitude of the spatial spectrum of the disturbances in the boundary-layer airflow generated by the suction distribution. The simplicity of the above equation (2) stems from the assumption that the receptivity coefficient is constant over the chordwise extent of each individual bundle, but may vary from bundle to bundle. This approximation improves in validity as both the individual bundle width and the average suction strength become smaller. In general, to further ensure that the absence of energy at predetermined wavelengths results from the destructive interference at these wavelengths between disturbances in the flow created by suction through the perforations, a further optimization of the perforation pattern within a bundle is carried out for each individual bundle using as a norm the disturbance flow field downstream of the bundle as given by solutions to the equations of motion, with the equations preferably in linearized form to simplify the computation. The optimized pattern will continue to have essentially negligible energy at the predetermined wavelengths. After each bundle is optimized by itself, further optimization of the overall arrangement of plural bundles is possible by spanwise shifting of one or more respective bundles relative to each other to create further destructive interference between any remaining flow disturbances downstream of each bundle. In other words, the invention can use not only destructive interference among the flow conditions generated by the respective perforations of a given single bundle, but also destructive interference between any flow disturbances remaining downstream of a given bundle and the flow pattern of the successive downstream bundle or bundles.

Figure 6A:
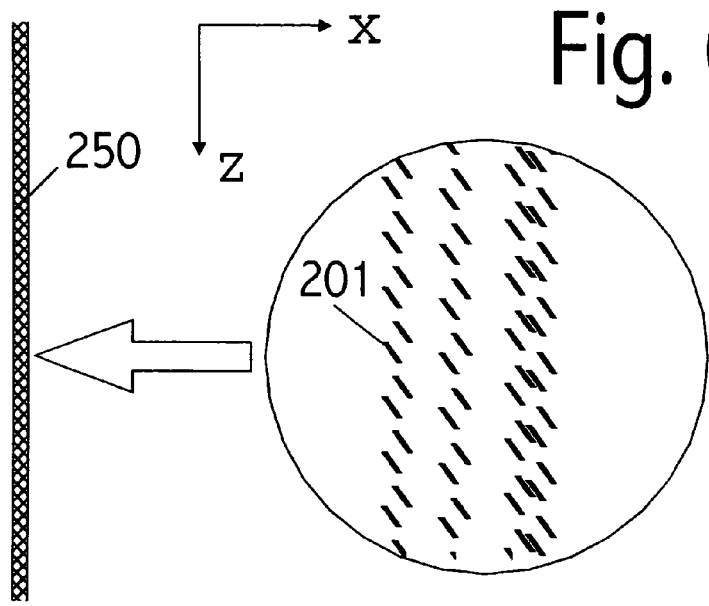
FIG. 6A is a view similar to that of FIG. 6, but showing micro-slots with their long axes oriented at a predetermined non-parallel and non-perpendicular oblique angle relative to the bundle longitudinal direction.
Figure 7A:
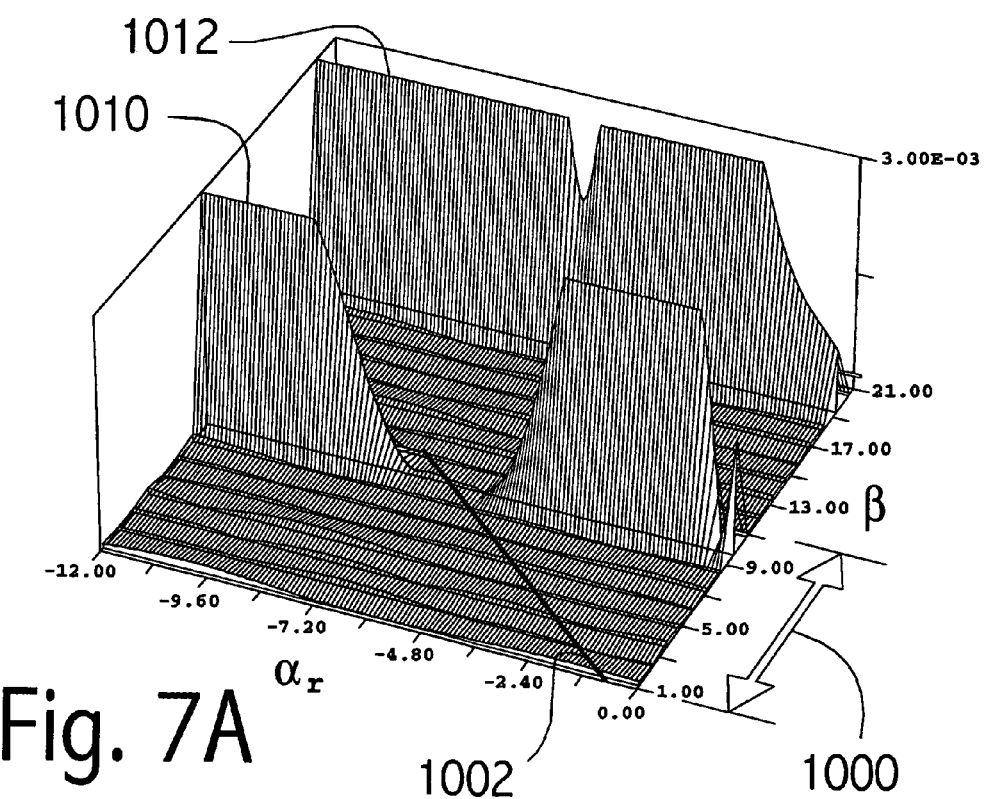
FIG. 7A is a graphical representation similar to that of FIG. 7, but showing the double Fourier transform of the spectrum produced by the single bundle of micro-slots oriented according to FIG. 6A.
Figure 10:
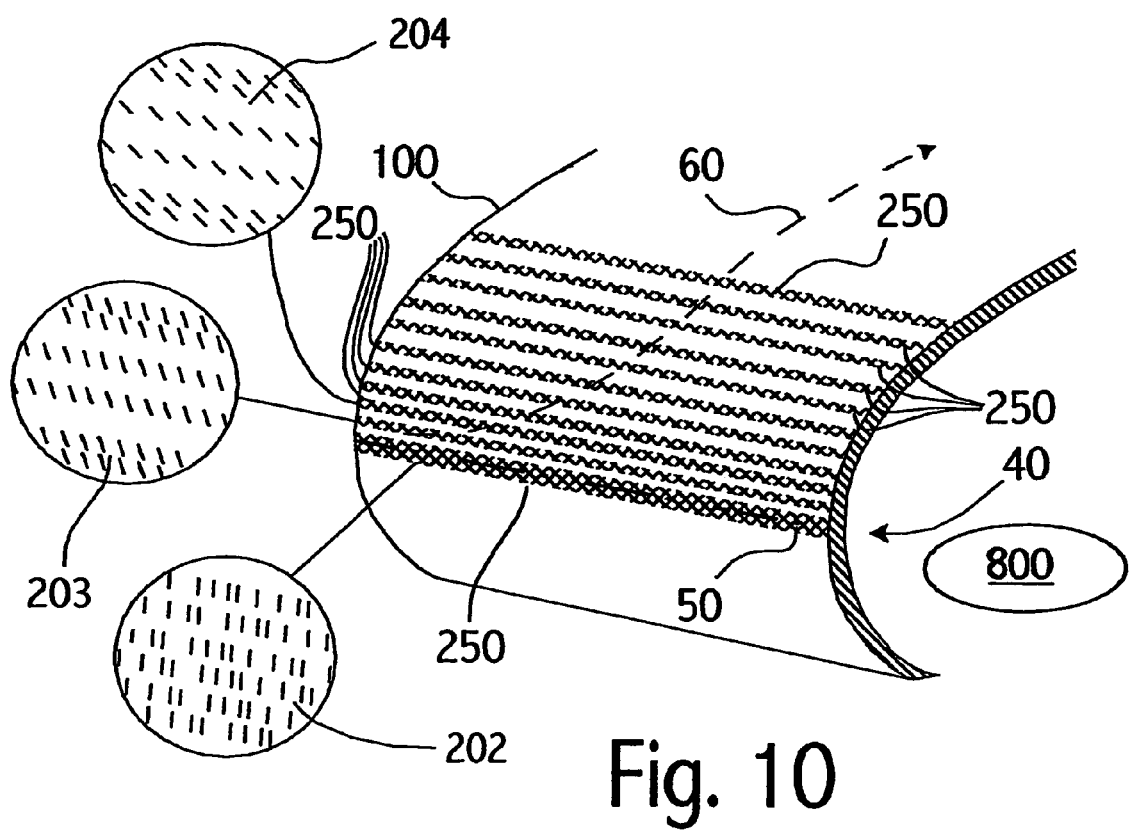
FIG. 10 is a schematic perspective view of a portion of the leading edge area of an airfoil of an aircraft having plural parallel spaced-apart bundles of micro-slots, whereby the micro-slots are arranged with different orientations at different chordwise locations, namely respectively arranged essentially perpendicularly to the local orientation of the potential flow streamline at each chordwise location, as shown in the enlarged detail views of the figure.

The slot geometry for another embodiment of the invention, wherein the slots 201 are slanted to a predetermined angle relative to the local free-stream direction and at a selected oblique angle relative to the longitudinal direction of the bundle 250, is shown in FIG. 6A. FIG. 7A shows the associated spectrum, with the desired absence of energy in the range $\alpha_1 < \alpha < \alpha_2$. Slots oriented along or parallel to the free-stream direction offer the least "frontal area" to the oncoming flow, hence allow a higher level of suction before "oversuction" takes place. Slots oriented essentially normal to the potential-flow streamlines offer smaller wavelengths in the flow direction. Which of the two is preferable depends on the actual flow conditions. At high Reynolds numbers, hence thin boundary layers, the latter is preferable. At lower Reynolds numbers, the former is preferable. FIG. 10 displays an arrangement of several parallel bundles 250 at and near the leading edge 50, with each bundle having micro-slots oriented essentially normal to the local potential-flow streamline 60, such as the micro-slots shown at 202, 203, 204. When the leading-edge region is most unstable to traveling waves (e.g. Gortler-Haemerlin modes), the spectrum of the leading-edge bundle is essentially absent of amplitude at spatial wavenumbers corresponding to these modes.

Figure 6B:
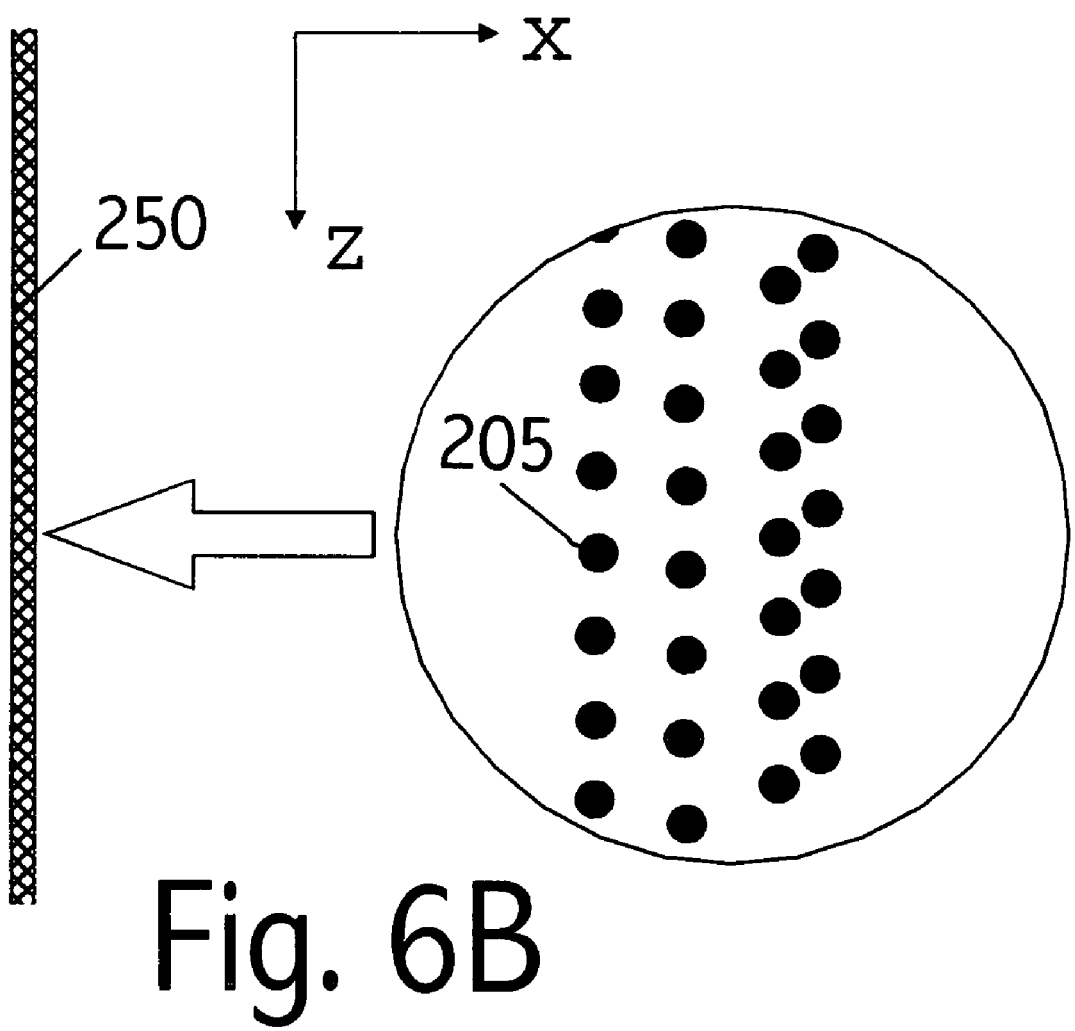
FIG. 6B is a further view similar to that of FIGS. 6 and 6A, but showing an arrangement of circular micro-holes arranged in a spatial pattern according to the invention.

It should further be noted, in connection with FIG. 6B, that the principle feature of the present invention, namely the mutual destructive interference among rows or groups of properly positioned perforations, can also be achieved with hole shapes other than elongated or oblong micro-slots. For example, FIG. 6B, shows a pattern of circular holes 205, which could alternatively be used in a bundle 250, for achieving the desired destructive interference. It is thus the selected pattern and arrangement of the perforations in each bundle that is most significant. Nonetheless, since the small circular holes 205 will be more subject to clogging and machining errors as discussed above, the elongated micro-slot shape is preferred according to the invention.

The absence of amplitude in the range $\alpha_1<\alpha<\alpha_2$ makes neighboring bundles 250 functionally substantially independent, so that adding a cloned bundle to either side of a given bundle will still yield and not destroy the minimizing property of either bundle. This is an important, and central, property of the bundles, and follows directly from the shift property of Fourier transforms. That is, letting x=0 be the location of a first bundle, the contribution to the Fourier transform function $\Im$ from a second bundle with similar range of minimized amplitudes (i.e. $\alpha_1<\alpha<\alpha_2$) and located $\Delta x$ downstream from the first bundle is simply $\exp(-i\alpha\Delta x)$ times the transform of the first bundle. Since the amplitude of this transform function is nearly zero in $\alpha_1<\alpha<\alpha_2$, the contribution to $\Im$ from the second bundle is nearly zero in this range of wavenumbers. Thus, the two bundles are functionally independent in the generation of CF modes.

Furthermore, since the range in $\alpha$ of amplitude minimization changes smoothly and slowly in the chordwise direction in comparison with the width of a bundle, neighboring bundles will always share a large part of their minimized $\alpha$ range and will not interfere with one another. Consequently, it is possible, after designing the perforation pattern of the bundle, to simply lay down bundle after bundle at chosen locations to build a complete arrangement with a specified porosity.

As will be discussed more concretely below, the suction flow is developed through the perforations by applying suction to a plenum under the perforated skin. The static pressure in the plenum below the perforated skin is not spatially uniform due to structural obstructions, standing waves, etc. As shown below, an estimate of the wavelengths of this spatial inhomogeneity provides the value of $\alpha_1$ and $\alpha_2$ for the minimization range $\alpha_1<\alpha<\alpha_2$.

The suction velocity distribution $V_{wall}(x,z)$ is proportional to the square-root of the pressure-drop, $\Delta p(x,z)$, across the perforated panel times the hole geometry, $hole(x,z)$. Since the bundle is narrow in x, variations in this direction can be neglected, and since the spatial variations in $\Delta p$ are small in amplitude compare to the mean, the square-root is expanded in a series to obtain $$V_{wall}(z) = \left(\Delta p_0 + \frac{1}{2}\Delta p(z) + \dots\right) hole(z) \quad (3)$$

Each product corresponds to a convolution in wavenumber space, $$V_{wall}(\beta) = \Delta p_0 hole(\beta) + \frac{1}{2}\Delta p_1(\beta) * hole(\beta) + \dots \quad (4)$$

The first term on the right hand side of the equation is the term that has been dealt with above. The second term leads to a spectral broadening of each Fourier mode of the geometry. The more localized the variation $\Delta p_1(\beta)$ is in space, the larger the broadening. Assume that, for example, the variation of suction pressure has a very localized Gaussian distribution with a σ of five centimeters. Then $\Delta p_1(\beta)$ has significant amplitudes (i.e. above 2% of peak value) up to $\beta=+/-0.5$ 1/mm, causing a spectrum broadening of +/-0.5 at the geometry peak of $\beta=9.66$ in this example. Using FIG. 3 to look up the corresponding change in $\alpha_r$, it turns out to be about +/-0.4 1/mm at the chosen location x/c=0.0076. Thus, the minimization in α must extend beyond +/-0.4 of the central value, $\alpha_r^\dagger=6.4$, to yield $6.0<\alpha<7.2$. In FIG. 7, the broadening about the CF mode $\alpha_r$-β relation (dark line 1002) would be a band extending along the line 1002. Note that the spectrum of the present optimized pattern is essentially zero over such a band along the line 1002, resulting in the desired insensitivity of the pattern to spatial variations in the plenum's pressure level.

Figure 8:
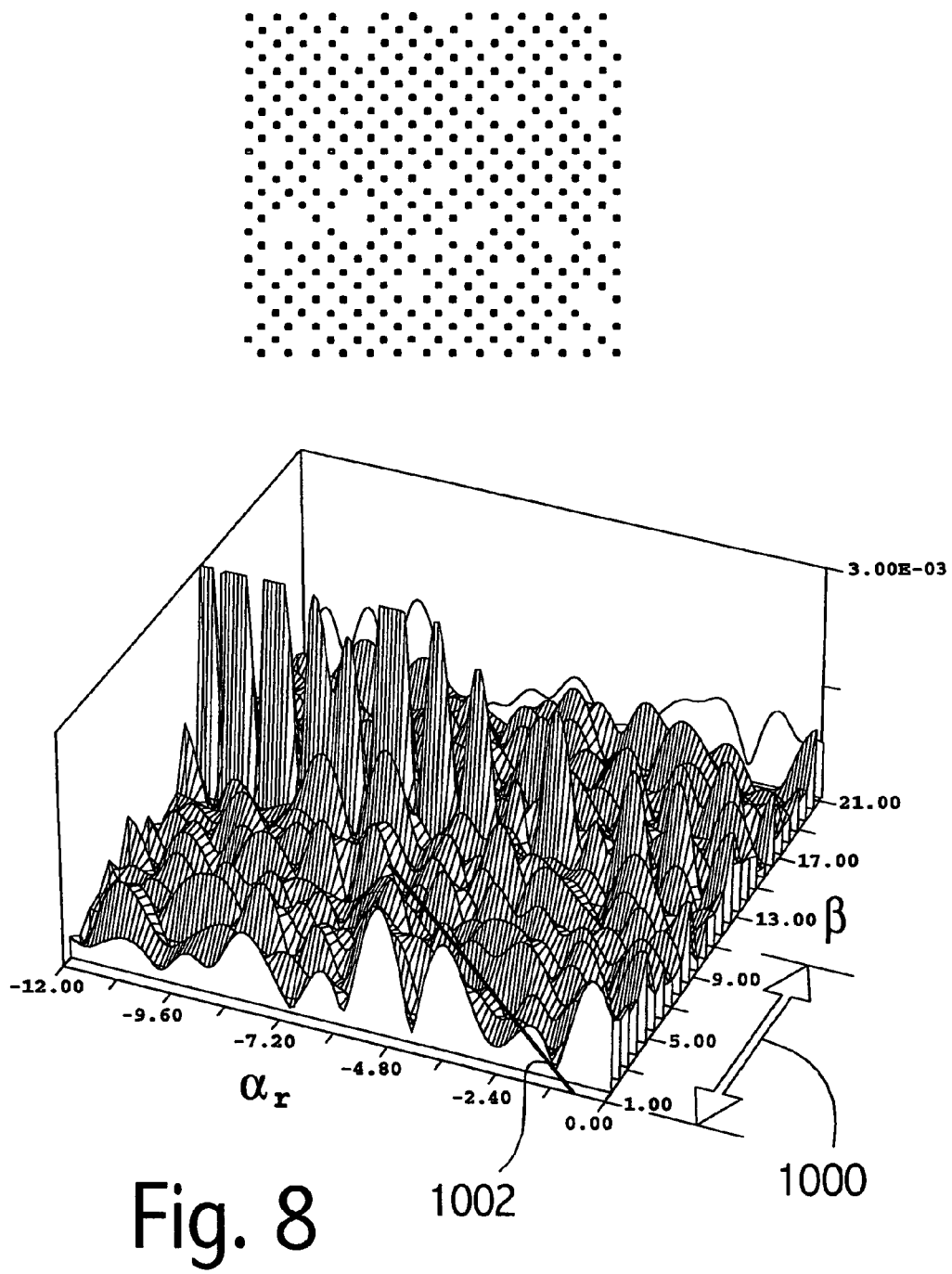
FIG. 8 is a three-dimensional graphical representation showing the spatial spectrum of a conventional suction hole pattern and distribution as shown in plan at the top of the figure.
Figure 9:
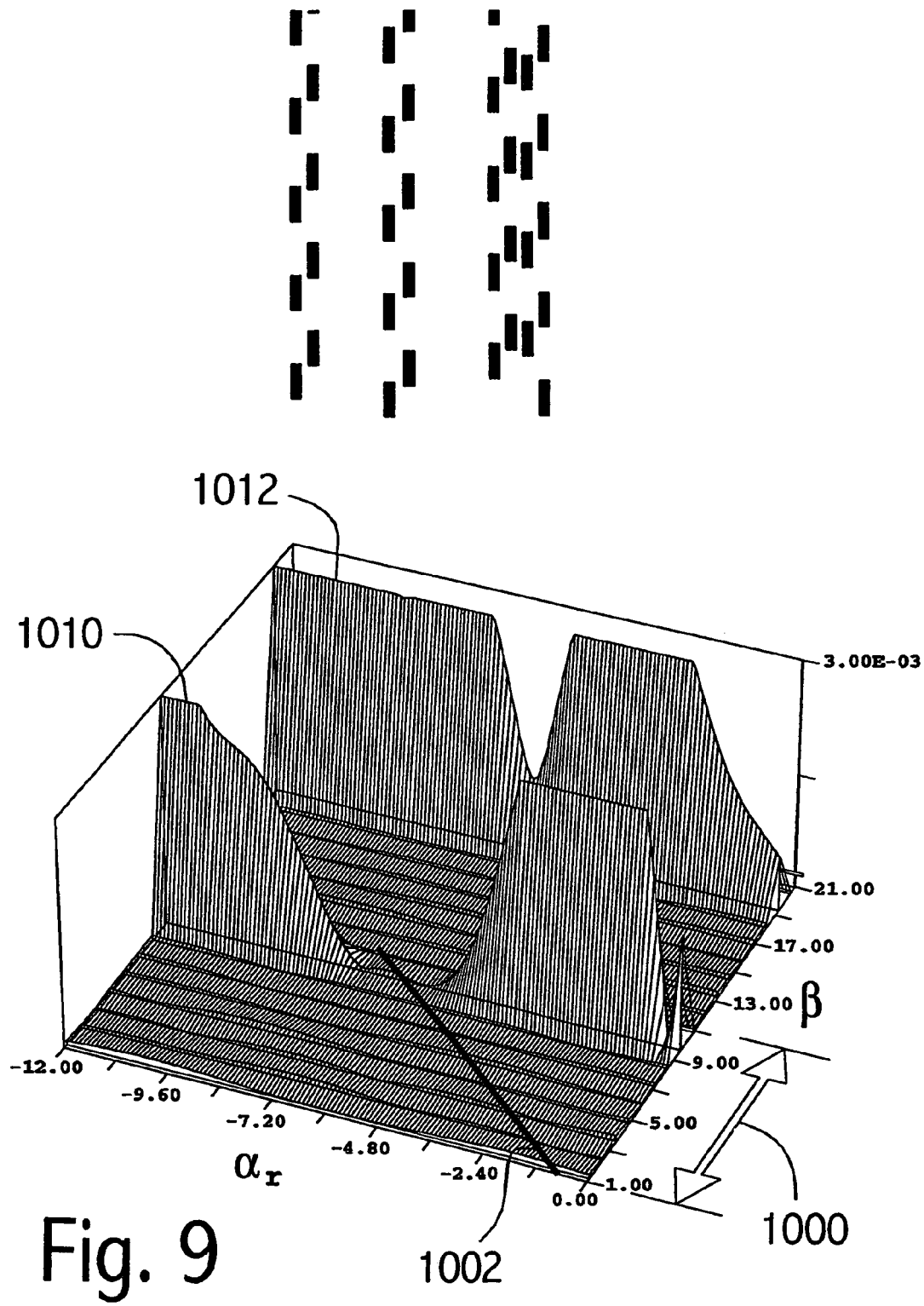
FIG. 9 is a spectrum diagram generally corresponding to FIG. 7A, for particular example perforation parameters, related to the inventive micro-slot perforation pattern shown in plan at the top of the figure.

Now the discussion will turn to a direct comparison between a conventional pattern and one optimized bundle. The conventional pattern is a rectangular area 7 mm wide in the x direction and periodic in z in which 70 μm holes are spaced in a checkerboard pattern having 0.5 mm maximum distance between holes as shown at the top of FIG. 8, with some holes clogged. The optimized bundle is the same as discussed above and is shown at the top of FIG. 9. Both hole patterns have the same total open area, hence approximately equal mass flux for a given pressure differential, and essentially equal peak suction velocities. The boring and machining tolerances are 15 and 20 μm, respectively, and the conventional pattern has a random number of plugged holes not exceeding 10% of the total. FIG. 8 shows the geometry and the associated spatial spectrum for the conventional pattern, and FIG. 9 shows the same information for the inventive tuned bundle. The amplitude of the spectra has been scaled to better display the values in the unstable wavenumber range. Note that both plots have the same limits.

It is clear from these two figures that the optimized inventive hole pattern of FIG. 9 leads to much lower forcing in the unstable wavenumber range along the line 1002 at equal average mass-flux in comparison to the conventional pattern shown in FIG. 8, hence can be justly labeled a high-performance pattern.

In consideration of the above discussion of the development of the preferred features of the invention, a concrete application example will now be discussed. FIG. 10 is a schematic perspective view of a portion of a leading edge area of an airfoil 40, such as a lifting wing, a control surface member, a stabilizer, a tailfin, or the like of an aircraft, as a representative aerodynamic body 40. The airfoil 40 includes a perforated outer skin 100, which is particularly provided with linearly extending groups or bundles 250 of rows of perforations 200 according to the invention. As can be seen, the bundles 250 of perforations all extend longitudinally parallel to the leading edge 50, i.e. parallel to the spanwise direction z, and are spaced apart from one another in the chord direction x. Thus, respective non-perforated surface areas are provided between and separating adjacent ones of the perforation bundles 250 from each other. A suction system 800 sucks air through the perforations.

In each bundle 250, the pattern and parameters of the perforations, e.g. the length, width, shape, spacing, orientation, periodicity, staggering, porosity (open perforation area relative to total area), number of rows, grouping of rows, and spacing of rows of the perforations in this bundle, are optimized in accordance with the principles of the invention discussed above. Namely, the pattern and parameters of the perforations of a given bundle are designed so that the bundle possesses a spatial spectrum that is essentially absent of energy (above the average "noise" energy level) at predetermined wavelengths such that the disturbances in the flow created by suction through the perforations cancel each other downstream of the bundle due to destructive interference of the flow disturbances at the predetermined wavelengths. In this manner, the excitation energy of the spatial spectrum associated with the respective bundle can be minimized particularly at the most troublesome wavelengths, i.e. the wavelengths of predetermined flow instabilities that otherwise appear in the boundary layer above the bundle at cruise conditions of the aircraft comprising the subject airfoil 40. These wavelengths are particularly the wavelengths at which cross-flow modes of the boundary layer flow are unsteady at the chordwise location of the chosen bundle, for example as described by the respective associated dispersion relation, e.g. in connection with FIG. 3.

While the micro-slots 200 of a given bundle 250 are generally and preferably oriented with their long axes all parallel to each other, the micro-slots of different bundles can have different orientations. As generally discussed above, due to the backswept extension of the leading edge 50 of the airfoil 40, the incident airflow attaches along the leading edge 50, and the flow streamlines outside of the boundary layer (potential flow) that impinge on the airfoil 40 away from the leading edge 50 will develop a curved airflow path 60. As further discussed above, depending on the particular flow conditions of a given airfoil, advantages can be achieved by orienting the micro-slots 200 of a given bundle 250 so that the long axes of the micro-slots are essentially perpendicular to the local free-stream direction as indicated by the free steam line 60.

Thus, as shown in respective enlarged detail portions of FIG. 10, the micro-slots 202 of a bundle 250 directly along the leading edge 50 are oriented substantially perpendicular to the lengthwise direction of this bundle and perpendicular to the local free stream flow, while the micro-slots 203 and 204 of bundles located successively farther away from the leading edge 50 are oriented at appropriate oblique angles relative to the lengthwise direction of extension of the given bundle 250 so that the respective micro-slots of the bundle are substantially perpendicular to the free-stream flow 60 at that chordwise location. As discussed above as an alternative, to achieve different advantages in connection with different flow conditions, the micro-slots could be arranged instead with their long axes essentially parallel to the local free-stream flow direction 60.

Figure 11:
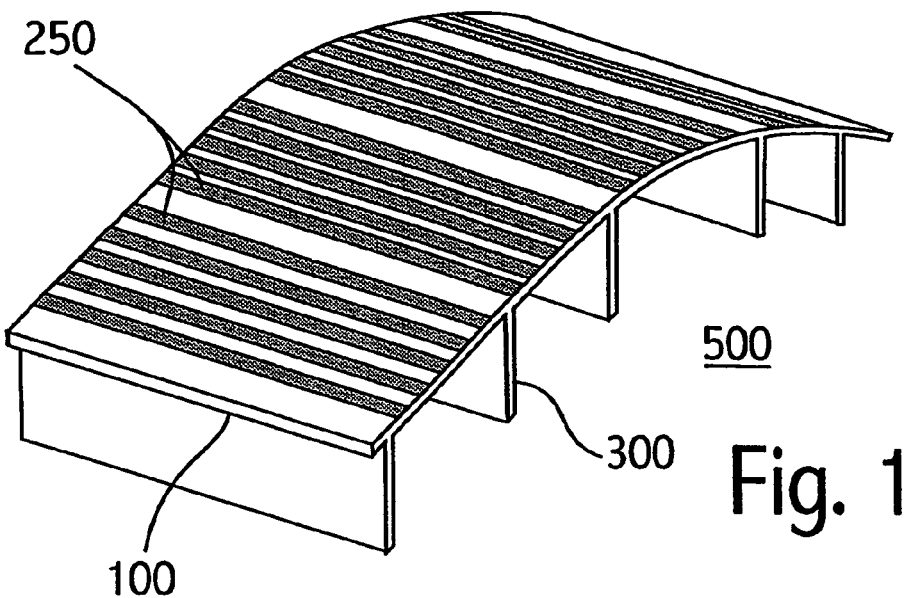
FIG. 11 is a schematic sectional view of a portion of an inventive airfoil arrangement including an outer perforated skin and a supporting structure including longitudinal ribs.

The complete structure of the airfoil 40 is further developed in connection with FIG. 11. As shown in FIG. 11, the perforated skin 100 must be structurally supported by an underlying support structure, which in this case comprises longitudinal ribs 300 in structural union with, e.g. joined or connected with, the outer skin 100. The ribs 300 extend substantially parallel to the leading edge 50 of the airfoil 40, thus also parallel to the perforation bundles 250. Accordingly, it is a simple design consideration, to ensure that the longitudinal ribs 300 run along below the skin 100 at the unperforated areas between adjacent perforated bundles 250. Thereby, the perforated outer skin 100 is structurally supported by the ribs 300, without the ribs 300 blocking any of the perforations 200 of the bundles 250, and without destroying or significantly influencing the particular designed flow properties of the designed spatial spectrum of each bundle. In other words, the flow properties of each bundle can be designed without consideration of the structural support needed by the airfoil, as long as the supporting ribs 300 are then arranged in the non-perforated skin areas between adjacent bundles 250. This overcomes a significant problem of prior art arrangements, in which previously provided perforations are either blocked by the underlying support ribs, or the pattern of intended perforations must be interrupted, which of course destroys the intended flow characteristics achieved by the conventional hole patterns.

Furthermore, the skin 100 and the supporting ribs 300 can be joined to each other in any conventionally known suitable manner, for example by welding or by riveting of flanges. Preferably, however, the outer skin 100 can be easily integrally manufactured with the supporting ribs 300, by a single extrusion thereof. The previously designed patterns of perforations making up the bundles 250 are then machined in any known manner into the extruded component.

Figure 12:
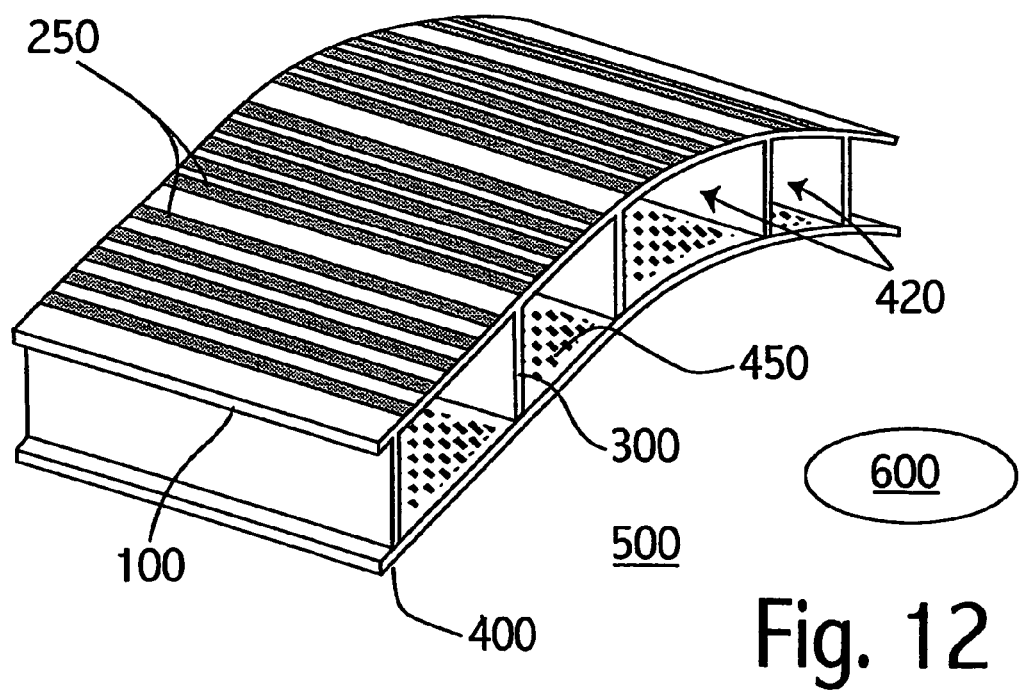
FIG. 12 is a schematic sectioned perspective view similar to FIG. 11, but showing another embodiment of an airfoil structure according to the invention, further including a perforated inner plate member for pressure head compensation.
Figure 8:
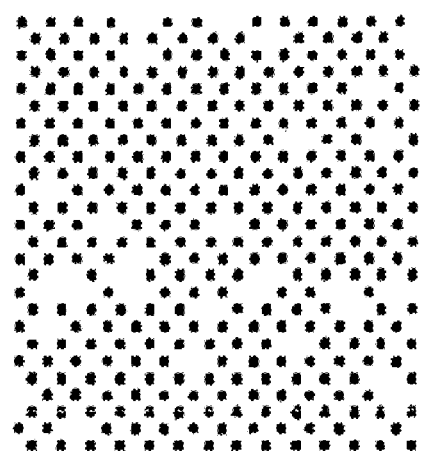
Figure 8:
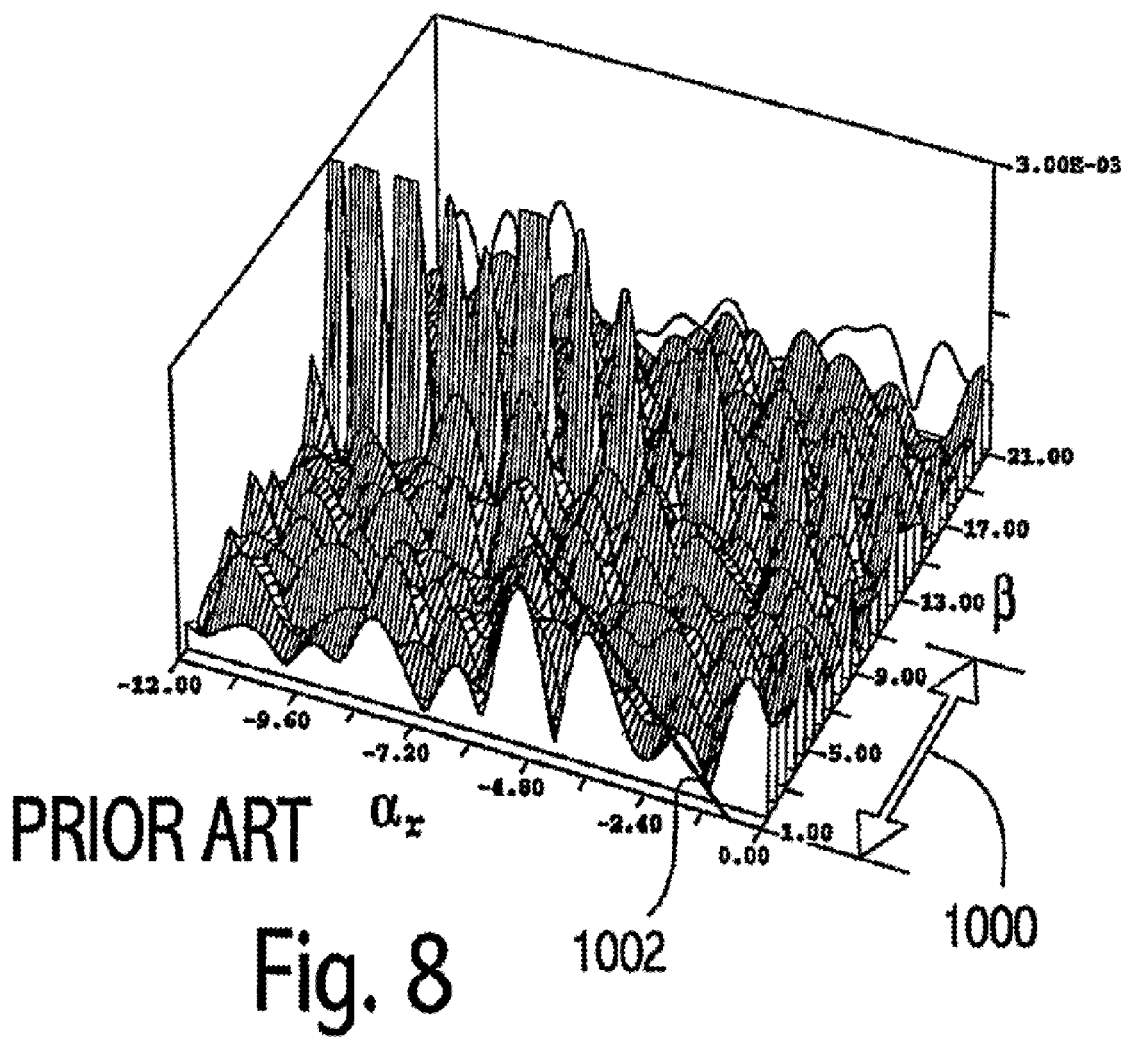

FIG. 12 schematically shows yet a further development of the total structure of the representative airfoil 40. In addition to the components shown and discussed in connection with FIG. 11, the embodiment of FIG. 12 further includes an inner perforated member 400 such as a perforated inner plate 400 that is welded, riveted, bonded, or in any other structural union with the longitudinal ribs 300, to form respective air channels 420 between the outer skin 100 and the inner plate member 400. Particularly, each channel 420 is bounded between the outer skin 100, the inner plate member 400, and respective adjacent ones of the ribs 300. This inner plate member 400 serves two important purposes. First, the inner plate member 400, together with the ribs 300 and the outer skin 100 form a strong rigid box beam construction with a high strength to weight ratio. Secondly, the air channels 420 formed by providing the inner plate member 400 can be used to control the suction effect or suction flow provided to each respective group of perforation bundles 250 within a chordwise range of the airfoil defined by a respective one of the air channels 420 between adjacent ones of the supporting ribs 300. The suction flow is applied by any conventionally known suction generator 600, to a common plenum 500 under the plate member 400, and then is distributed as needed through the holes 450 of the plate member 400 to the individual channels 420, as will be discussed in further detail.

As generally discussed above, oversuction problems of excessive suction flow velocities through particular perforations can be caused by the streamwise variation of the external pressure locally acting on the airfoil 40. Thus, if a constant and uniform suction or vacuum pressure is applied to the entire underside of the perforated skin 100, then the pressure differential through any given perforation will depend on and vary with the external pressure. For simplicity and reliability, it is desirable to provide a single constant suction plenum pressure, but it is also advantageous to compensate for the streamwise variation of pressure differential, so as to achieve a controlled and intended suction mass flux for all of the perforations along the entire perforated areas of the skin. The present invention can compensate for the streamwise pressure variation in three ways, which each use the property of independence of the respective bundles: first by changing the porosity of respective bundles in the streamwise direction, secondly by modifying the associated supporting structure and particularly the perforated inner plate member 400, and thirdly by a combination of the preceding two possibilities.

The secondary perforations or holes 450 of the inner plate member 400 communicate between each air channel 420 and the single open plenum area 500 below the inner plate member 400. The width (i.e. chordwise extent) of each channel 420 is small enough between successive ribs 300 such that the external pressure variation over the width of any one channel 420 and associated group of bundles 250 is small. The suctioned boundary layer air flows through the perforations 200 in the outer skin 100, through the height of the respective communicating channel 420, and then through the secondary perforations 450 of the inner perforated plate member 400 to reach the internal air plenum 500 that is maintained at an essentially constant and uniform suction or vacuum pressure by the suction generator 600. The suction generator 600, plenum 500 and air channels 420, individually or collectively can be considered as forming a suction system.

In the area of each respective individual channel 420, the inner perforated plate member 400 has a predetermined porosity provided by the secondary perforations 450, to achieve a selected throttling effect to control the suction pressure and suction flow through the associated channel 420. Particularly, the predetermined porosity provided by the secondary perforations 450 of the inner plate member 400 is such that the total of the flow resistance offered by the primary perforations 200 of the outer skin 100 along this particular air channel 420 plus the flow resistance of the secondary perforations 450 through the inner plate member 400 at the area of this channel 420 yields the desired flow rate at the particular chordwise point of interest. Namely, the porosity of the inner plate varies from channel to channel precisely as required to counteract the external variations in pressure. The hole pattern of the secondary perforations 450 in the inner plate member 400 may be relatively freely chosen in comparison to the inventive patterns of the perforations 200 on the outer skin 100, because the inner plate member 400 is not subject to the flow conditions of the external boundary layer flow.

Furthermore, the longitudinal ribs 300 preferably have a high thermal conductivity and will conduct heat from the inner plenum 500 to the outer skin 100. Also, warm air can be selectively blown into the inner plenum 500 to be blown out through the perforations 200 in the outer skin 100, to provide a heat flux to the outer skin 100, which can prevent or assist in the removal of ice build-up on the outer skin surface. This operation of the inventive structure is, of course, applicable at times when boundary layer control by means of suction is not required.

It should also be noted that the width of each bundle 250 and the width of each channel 420 can vary or taper slowly in the spanwise length direction, to accommodate the slow spanwise change in potential and boundary layer flow quantities in weakly conical flows, such as those present along the tapered lifting surfaces, like wings, stabilizers, and fins of the aircraft.

INDUSTRIAL APPLICABILITY

The present inventive structure including a perforated skin for influencing or controlling the boundary layer flow of a fluid along a surface is especially applicable to the outer skin of airfoil members, such as the lifting wings, stabilizers, fins, control surfaces, and air intake surfaces of an aircraft. The inventive structure is further applicable to any other situation involving a relatively high speed boundary layer flow of a fluid along a surface. For example, the inventive perforation patterns are applicable to surfaces of wind tunnels for reducing or eliminating flow disturbances. Hydrodynamic applications are also possible.

The invention claimed is:

1. A laminar flow control apparatus comprising:
   an outer skin having a plurality of perforations communicating therethrough, and having an outer surface adapted to be exposed to an airflow including a boundary layer airstream flowing along said outer surface; and
   a suction system communicating with said perforations on a side of said outer skin opposite said outer surface and adapted to suck air from the boundary layer airstream through said perforations;
   wherein flow disturbances are created in the boundary layer airstream due to the sucking of the air through said perforations;
   characterized in that said perforations are spatially distributed in a spatial pattern of said perforations such that the flow disturbances undergo mutual destructive interference at least at one or more selected wavelengths.

2. The laminar flow control apparatus according to claim 1, characterized in that said spatial pattern of said perforations is arranged so that the sucking of the air through said perforations generates a minimum excitation of flow instabilities in the boundary layer airstream.

3. The laminar flow control apparatus according to claim 1, characterized in that said spatial pattern of said perforations has a spatial spectrum essentially absent of energy at said one or more selected wavelengths.

4. The laminar flow control apparatus according to claim 1, characterized in that said one or more selected wavelengths correspond to flow wavelengths of predetermined flow instabilities appearing in the boundary layer airstream.

5. The laminar flow control apparatus according to claim 1, characterized in that said one or more selected wavelengths correspond to flow wavelengths of predetermined unstable flow modes appearing in the boundary layer airstream at a particular chordwise location at which at least a selected portion of said spatial pattern of perforations is located on said outer skin.

6. The laminar flow control apparatus according to claim 1, characterized in that said spatial pattern comprises at least one elongated longitudinally extending bundle of at least one longitudinally extending row of said perforations, which are respective micro-slots each having a length in a range of 100 to 3000 µm and a width in a range of 50 to 250 µm.

7. The laminar flow control apparatus according to claim 1, characterized in that said spatial pattern comprises a plurality of elongated longitudinally extending perforation bundles which are arranged parallel to each other and spaced apart from one another with respective major unperforated skin areas therebetween, and which each include a plurality of longitudinally extending rows of said perforations, wherein said rows are arranged parallel to each other in row groups of adjacent ones of said rows respectively having said perforations staggered from one another, and with minor unperforated skin areas between adjacent ones of said row groups within each one of said bundles.

8. The laminar flow control apparatus according to claim 7, characterized in that said row groups in a respective one of said bundles respectively include different numbers of said rows of said perforations.

9. The laminar flow control apparatus according to claim 1, characterized in that said spatial pattern comprises plural elongated longitudinally extending perforation bundles which each include plural longitudinal rows of said perforations, wherein said bundles are arranged parallel to each other and spaced apart from one another with unperforated skin areas therebetween, and wherein said rows of said perforations are arranged to generate said destructive interference relative to each other and said perforation bundles are arranged to generate said destructive interference relative to each other.

10. A laminar-flow control surface exposed to a boundary-layer air stream, said control surface comprising:
an outer skin with a plurality of primary perforations through said skin; and
a suction system coupled to said outer skin to draw air from said boundary-layer air stream through said primary perforations;
wherein said primary perforations are spatially distributed with respect to each other in a spatial pattern of said primary perforations so as to generate a minimum excitation of flow instabilities in said boundary-layer air stream and so as to generate flow disturbances in said boundary-layer air stream such that said flow disturbances will cause mutual destructive interference with one another.

11. A laminar-flow control surface exposed to a boundary-layer air stream, said control surface comprising:
an outer skin with a plurality of primary perforations through said skin; and
a suction system coupled to said outer skin to draw air from said boundary-layer air stream through said primary perforations;
wherein said primary perforations are spatially distributed relative to one another in a spatial pattern so as to have a spatial spectrum essentially absent of energy at predetermined wavelengths such that disturbances in said boundary-layer air stream created by said drawing of said air through said primary perforations at least partially cancel each other through destructive interference at said predetermined wavelengths.

12. In an aircraft having an airfoil that includes a leading edge and an outer skin with an outer surface adapted to have a boundary layer airstream flow therealong and that has perforations communicating through said outer skin to said outer surface,
an improvement characterized in that:
said perforations are spatially arranged in elongated bundles of said perforations,
said bundles extend longitudinally essentially parallel to said leading edge and to each other, and said bundles are laterally spaced apart from one another by respective major unperforated skin areas therebetween,
each one of said bundles includes plural longitudinally extending rows of said perforations, and
said perforations are spatially distributed in a spatial pattern of said perforations such that flow disturbances caused in said boundary layer airstream by said perforations undergo mutual destructive interference with each other at least at one or more selected wavelengths determined by said spatial pattern.

13. The improvement in the aircraft according to claim 12, characterized in that each one of said perforations is an elongated slot having a length in a range of 100 to 3000 μm and a width in a range of 50 to 250 μm.

14. The improvement in the aircraft according to claim 13, characterized in that said length is not greater than 500 μm.

15. The improvement in the aircraft according to claim 13, characterized in that said length is not greater than 300 μm.

16. The improvement in the aircraft according to claim 12, characterized in that each one of said perforations of a respective one of said bundles is an elongated slot having a long axis oriented parallel to a longitudinal extension direction of said respective bundle.

17. The improvement in the aircraft according to claim 12, characterized in that each one of said perforations of a respective one of said bundles is an elongated slot having a long axis oriented perpendicular to a longitudinal extension direction of said respective bundle.

18. The improvement in the aircraft according to claim 12, characterized in that each one of said perforations of a respective one of said bundles is an elongated slot having a long axis oriented at an oblique angle to a longitudinal extension direction of said respective bundle.

19. The improvement in the aircraft according to claim 12, characterized in that said perforations are elongated slots having long axes thereof oriented parallel to each other within each respective one of said bundles, and said slots of a first one of said bundles are oriented with said long axes thereof in a different direction in comparison to said long axes of said slots of a second one of said bundles.

20. The improvement in the aircraft according to claim 19, characterized in that said slots of each respective one of said bundles are oriented with said long axes thereof essentially perpendicular to a local flow direction of the boundary layer airstream flowing over said respective bundle.

21. The improvement in the aircraft according to claim 19, characterized in that said slots of each respective one of said bundles are oriented with said long axes thereof essentially parallel to a local flow direction of the boundary layer airstream flowing over said respective bundle.

22. The improvement in the aircraft according to claim 12, characterized in that said rows of said perforations in a respective one of said bundles are arranged in plural parallel row groups of adjacent ones of said rows respectively having said perforations staggered from one another and with minor unperforated skin areas between adjacent ones of said row groups within said respective bundle.

23. The improvement in the aircraft according to claim 22, characterized in that a first one of said row groups within said respective bundle has a different length, width, orientation, spacing, periodicity, staggering, number, or pattern of said perforations in comparison to a second one of said row groups within said respective bundle.

24. The improvement in the aircraft according to claim 23, characterized in that said perforations are holes with a circular cross-section.

25. The improvement in the aircraft according to claim 12, wherein the aircraft further includes a suction system that communicates with said perforations and that is adapted to suck air from the boundary layer airstream through said perforations, characterized in that the flow disturbances are created in the boundary layer airstream due to the sucking of the air through said perforations, and said perforations are spatially distributed in said spatial pattern in at least one of said bundles such that the flow disturbances undergo the mutual destructive interference with each other at least at the one or more selected wavelengths.

26. The improvement in the aircraft according to claim 25, characterized in that said spatial pattern of said perforations has a spatial spectrum essentially absent of energy at said one or more selected wavelengths.

27. The improvement in the aircraft according to claim 25, characterized in that said one or more selected wavelengths correspond to flow wavelengths of predetermined flow instabilities appearing in the boundary layer air stream.

28. The improvement in the aircraft according to claim 12, further comprising structurally supporting ribs extending along and joined to said outer skin on a side thereof opposite said outer surface at said major unperforated skin areas.

29. The improvement in the aircraft according to claim 28, characterized in that said outer skin and said ribs are integral with one another and together form an integral unitary component.

30. The improvement in the aircraft according to claim 28, further comprising an inner plate joined to said ribs opposite and spaced from said outer skin, thereby forming air channels respectively bounded between said outer skin, said inner plate and respective adjacent ones of said ribs, wherein said inner plate has holes communicating therethrough into said air channels, and said holes provide different respective total porosities of said holes communicating into different ones of said air channels.

31. An airfoil having an outer surface sustaining a boundary-layer air stream, said airfoil having a forward leading edge and having at least part of said outer surface comprising a laminar-flow control surface exposed to said boundary-layer air stream, said control surface comprising:

an outer skin with a plurality of primary perforations through said outer skin;

a suction system coupled to said outer skin to draw air from said boundary-layer air stream through said primary perforations, thereby causing disturbances in said boundary-layer air stream;

said primary perforations forming a plurality of spaced apart, longitudinal perforated areas aligned essentially parallel to said leading-edge of said airfoil and separated from one another by non-perforated surface areas, at least one of said longitudinal perforated areas having primary perforations distributed to produce destructive interference between said disturbances, said destructive interference occurring downstream of said at least one of said longitudinal perforated areas at predetermined spatial wavelengths.

* * * * *

UNITED STATES PATENT AND TRADEMARK OFFICE
CERTIFICATE OF CORRECTION

PATENT NO. : 7,152,829 B2
APPLICATION NO. : 10/511930
DATED : December 26, 2006
INVENTOR(S) : Bertolotti It is certified that error appears in the above-identified patent and that said Letters Patent is hereby corrected as shown below:

Drawings,
Delete sheet 7 with Fig. 8 and insert attached copy of Fig. 8;

Column 9,
In equation (1), replace "$\mathcal{F}*$" by --$\mathcal{F}^*$--;
Line 36, replace "function $\mathfrak{I}$" by --function $\mathcal{F}$--;

Column 11,
Line 38, replace "function $\mathfrak{I}$" by --function $\mathcal{F}$--;
Line 43, replace "function $\mathfrak{I}$" by --function $\mathcal{F}$--.

Signed and Sealed this

Twenty-sixth Day of June, 2007

JON W. DUDAS
*Director of the United States Patent and Trademark Office*

PRIOR ART